April 16, 1940.                R. P. JONES ET AL                2,197,744
                            CARBURETING WATER GAS
                            Filed Dec. 4, 1936              2 Sheets-Sheet 1
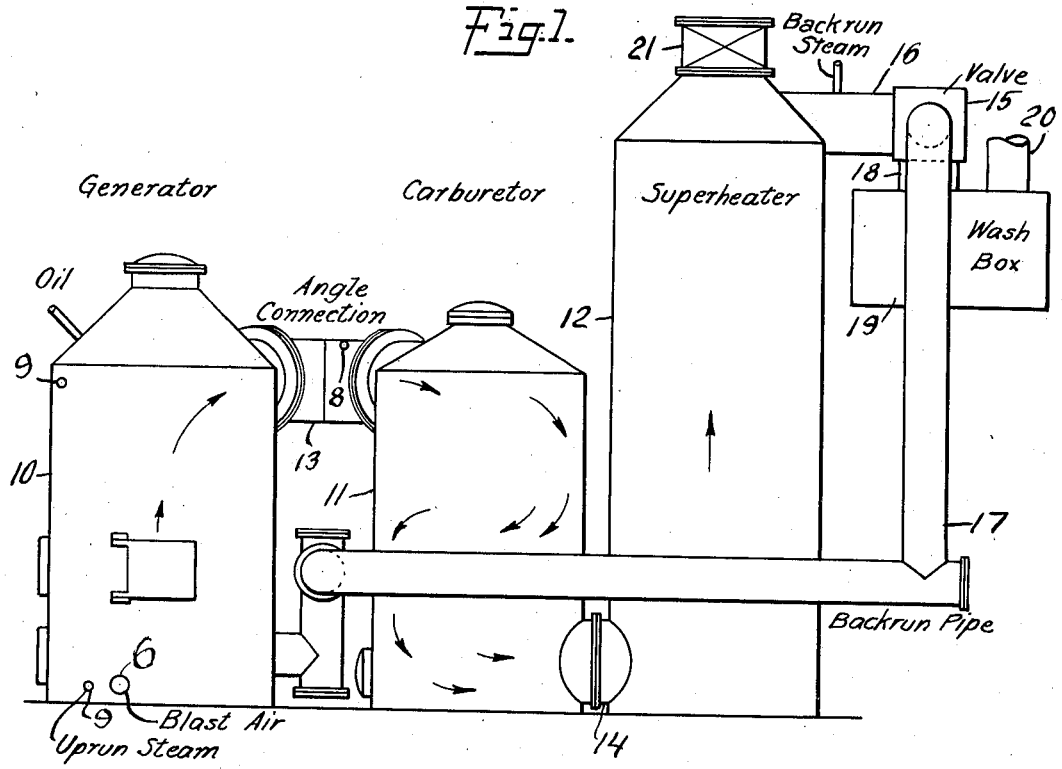
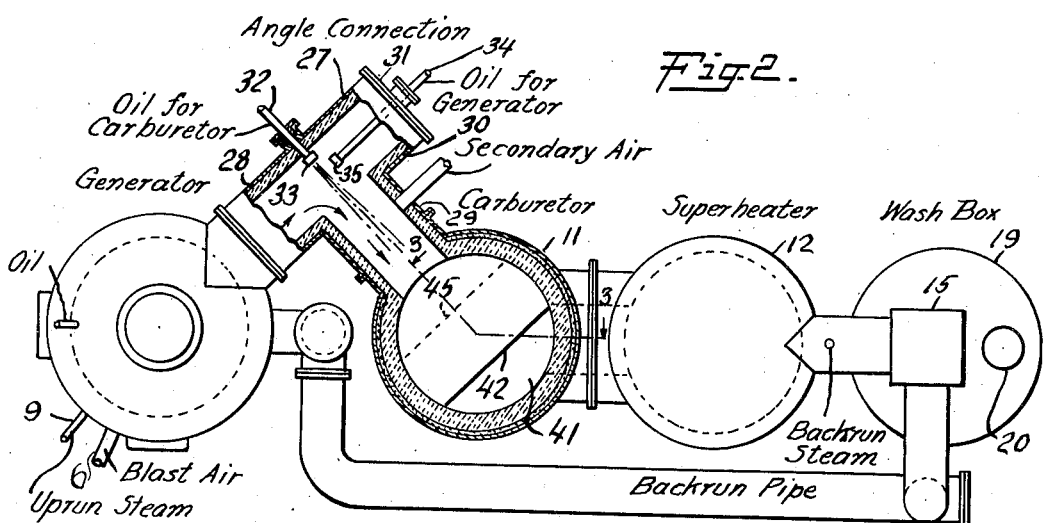
INVENTORS
Robert P. Jones
Robert L. Ellis
BY
ATTORNEY April 16, 1940.  R. P. JONES ET AL  2,197,744
CARBURETING WATER GAS
Filed Dec. 4, 1936   2 Sheets-Sheet 2
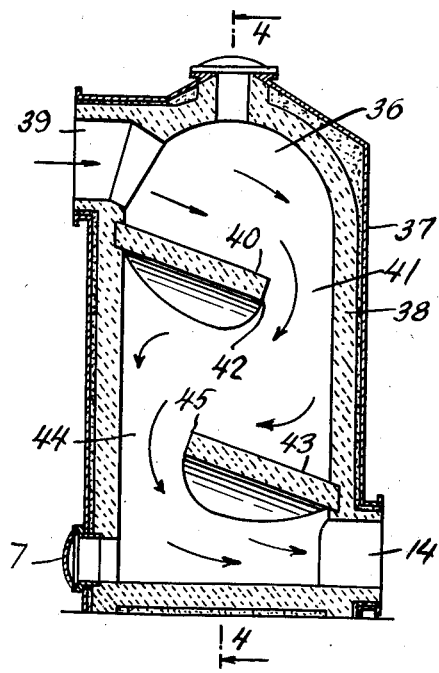
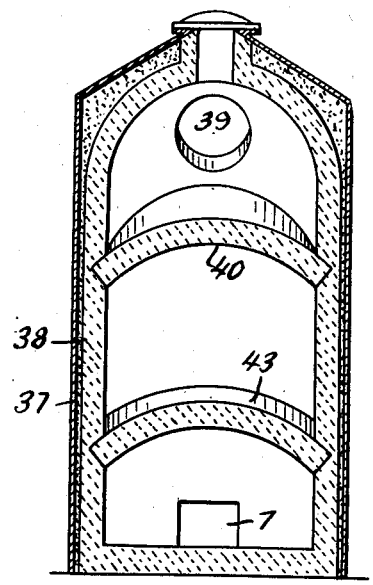
INVENTORS
Robert P. Jones
Robert L. Ellis
BY
ATTORNEY Patented Apr. 16, 1940

2,197,744

UNITED STATES PATENT OFFICE 2,197,744

CARBURETING WATER GAS

Robert P. Jones and Robert L. Ellis, Miami, Fla.; said Jones assignor to said Ellis Application December 4, 1936, Serial No. 114,105

7 Claims. (Cl. 48—74)

This invention relates to carbureted water gas manufacture.

An object of this invention is to provide a method for efficiently carbureting water gas utilizing heavy oil such as bunker C oil or other crude oils as the carbureting medium, which method can be carried out in existing carbureted water gas installations with relatively slight changes in the carburetor, and with substantially no change in the remainder of the installation.

A further object is to provide a carburetor of novel design particularly adapted for using heavy or crude oils as the carbureting medium for enriching water gas, and the external dimensions of which carburetor are substantially the same as the carburetors of conventional water gas sets but which differs from conventional carburetors in its interior structure and arrangement.

Still a further object is to provide a process for carbureting water gas utilizing heavy oils as the carbureting medium in which the problem of handling the carbonaceous deposits formed upon decomposition of the oil is minimized, if not eliminated, and the formation of smoke and soot upon blasting the fuel bed is materially reduced. Other objects and advantages of this invention will appear from the following detailed description thereof.

As the gas oils which have been used for carbureting purposes in the past are now becoming more expensive and less available, one of the important problems confronting the manufacturers of carbureted water gas is the use of heavy oil such as bunker oil as the carbureting medium. Such heavy oils cannot practically be used in the usual checkerbrick type carburetors, due to excessive quantities of carbon deposited in the checkerwork, requiring frequent stoppages and cleanings of the carburetor, with consequent reduction in the effective capacity of the water gas set.

It has been proposed to employ such heavy oil in carbureted water gas equipment, the carburetor of which is modified to partially or completely omit the checkerbrick therefrom. These methods are open to a number of disadvantages. The complete removal of checkerbrick leaving a carburetor completely unobstructed from top to bottom thereof reduces the thermal capacity of the carburetor and results in a decided decrease in the oil efficiencies of the set. Moreover, the carbonaceous material formed upon decomposition of the oil introduced into the carburetor accumulates on the bottom of the carburetor in a hard form, baked to the base and side walls, rendering it difficult to remove. During the blasting cycle following the carbureted water gas making cycle the blast gases from the generator passing through the carburetor and superheater pick up particles of carbon, particularly the carbon collected at the base of the carburetor, as the blast gases sweep thereover, and carry the carbon particles through the superheater from which they are discharged into the atmosphere through the stack, forming highly objectionable dense clouds of smoke and soot.

This invention contemplates the provision of process and apparatus for making carbureted water gas involving a minimum of change in existing three-shell carbureted water gas equipment so that such existing equipment at comparatively little expense can be modified to practice this invention. In accordance with the preferred embodiment of this invention, the carburetor is provided with two baffles, one beneath and contiguous to the inlet extending downwardly from the inlet and the other extending upwardly immediately above the outlet from the carburetor, which outlet is in the side of the carburetor opposite to that containing the inlet. The carburetor is thus divided to produce a tortuous or circuitous path of flow which is of substantial extent in cross-section throughout the entire length thereof, and which path of flow is defined by the baffles and the side walls, top and bottom of the carburetor. Owing to the relatively large cross-sectional extent of the path of flow the possibility of stoppage of gas flow through the carburetor by accumulation of carbonaceous material is eliminated.

The baffles provide an extended surface on which carbonaceous material may collect in the form of relatively thin layers, in which form it can readily be burned during a subsequent blasting cycle, combustion thereof being supported by excess secondary air introduced into the carburetor. The changes in the direction of flow of the gas effect removal of carbonaceous material carried by the gas in suspension and cause this material to settle onto the baffles.

The heavy oil utilized to enrich the uprun water gas is preferably introduced into the angle connection between the generator and carburetor, the oil spray being disposed so that it discharges oil toward the inlet of the carburetor. By so doing, an extended path of flow is provided, which path is traversed by the oil and water gas which, while so doing, is subjected to radiant heat emanating from the walls and baffles of the carburetor. Moreover, turbulence is set up in the flowing gas mixture due to the changes of direction in the path of flow through the carburetor. Hence, effective cracking of the oil, with the production of maximum quantities of fixed combustible gas, takes place.

Contrary to the expectations of those skilled in the art, in practice it has been found that the introduction of heavy oil in the angle connection between the generator and carburetor does not result in the formation of excessive deposits on the walls of this connection. The introduction of the oil in the angle connection is an important feature of this invention, since it permits prolonged contact between the oil and the water gas. During the backrun cycle oil may be introduced onto the generator fuel bed from a spray disposed in the angle connection between the generator and the carburetor and so positioned that the oil is discharged into the steam stream flowing into the generator in the direction of flow thereof.

In practice it has been found that the process of making carbureted water gas hereinabove briefly described results in marked generator fuel and oil economies as compared with existing carbureted water gas procedures. This may be attributed to the following factors:

The refractory material introduced into the carburetor in the form of baffles results in effective utilization of available heat. During the blasting cycle the air and blast gases passing over the top baffle disposed contiguous to the inlet are ignited promptly upon entrance into the carburetor and the flow of the burning blast gases in a circuitous path so that the burning gases contact with the baffles and lining of the carburetor results in efficient absorption of heat.

During the subsequent gas making cycle the atomized oil introduced into the angle connection between the generator and carburetor into the flowing water gas stream passing therethrough is partially vaporized before it enters the carburetor, the oil vapors and liquid oil particles flowing with the water gas into the carburetor. This mixture contacts with the hot surfaces of the dome, carburetor lining, and baffle plates, resulting in effective cracking of the oil. The oil gas thus produced and the water gas flow in a circuitous path through the carburetor, with consequent thorough contact between the oil gas and the water gas and subjection of the mixture to radiant heat from the dome, lining and baffles, with marked improvement in oil efficiencies. Carbonaceous material formed upon cracking of the oil settles in relatively thin layers over the baffles.

During the backrun of steam through the set, some of the carbon in the carburetor may react therewith to form water gas, the mixture of water gas and steam passing through the connection between the carburetor and generator into the generator. Heavy oil may be introduced in the angle connection where it mixes with this mixture of steam and water gas, the resultant mixture passing down through the fuel bed in the generator.

During a subsequent blasting cycle excess air introduced into the carburetor supports combustion of the carbonaceous deposits on the baffles. Due to the relatively thin layer of carbon resting on the baffles, substantially complete combustion thereof takes place, so that the blast gases leaving the stack do not contain substantial amounts of unconsumed carbon. Hence, it is possible to blast the water gas set, operating in accordance with this invention, without producing dense clouds of smoke and soot.

In the accompanying drawings, showing a preferred embodiment of apparatus suitable for carrying out this invention, Fig. 1 is a side elevation of a carbureted water gas set having a generator, carburetor and superheater connected in series;

Fig. 2 is a plan view, partly in section, of the generator, carburetor and top angle connection therebetween;

Fig. 3 is a vertical section through the carburetor taken on line 3—3 of Fig. 2, and Fig. 4 is a vertical section on the line 4—4 of Fig. 3 and like Fig. 3 shows the interior construction of the carburetor.

Referring to the drawings, Fig. 1 illustrates a carbureted water gas set comprised of generator 10, carburetor 11, and superheater 12, joined in series. The top of the generator and carburetor are connected by angle connection 13, and the bottoms of the carburetor and superheater by crossover 14. A three-way valve 15 is connected to the top of the superheater by pipe 16 and to the bottom of the generator by pipe 17. This valve is connected by pipe 18 to washbox 19, which is provided with takeoff pipe 20. Operation of valve 15 enables gas to be passed to the washbox from the top of the superheater while closing off the backrun pipe 17 and from the base of the generator while closing off the pipe 16. Blast valve 21 in the top of the superheater when open permits flow of blast gases from the superheater into the stack (not shown). The generator may be equipped with the usual steam inlets 9 disposed above the top of the fuel bed and beneath the grate and an air blast inlet 6. A secondary air inlet 8 may be disposed in the angle connection between the carburetor and the generator for introducing an excess of secondary air to the carburetor during the blasting cycle, the amount of air thus introduced being sufficient to support not only combustion of the blast gases but also carbonaceous material deposited in relatively thin layers upon the partitions or baffles, as hereinafter more fully described. A cleanout opening 7 closed by a suitable door is preferably provided at the base of the carburetor.

Referring particularly to Figs. 2, 3 and 4, which show a form of apparatus adapted to carry out the method according to the present invention, angle connection 13 is comprised of two short horizontal pipes joining at right angles, and provided with the usual refractory lining 27. Pipe 28 connects with the top of the generator 10, and pipe 29 with the top of the carburetor 11, the axes of these pipes intersecting the vertical axes of the generator and carburetor, respectively. Generator pipe 28 is joined, intermediate of its length, by carburetor pipe 29, the axes intersecting at about right angles, and projects beyond the latter to provide leg 30, which is closed by removable door 31 in the end of pipe 28. Thus a stream of gas must make a right angle turn in passing through the angle connection between generator and carburetor.

Carburetor oil spray 32 is located in the wall of pipe 28, on the projected axis of carburetor pipe 29, and is arranged so that a spray of oil particles, coaxial with carburetor pipe 29, can be discharged into the carburetor pipe toward the interior of the carburetor. The spray 32 is comprised of a pipe having a single spud 33, consisting of a pipe plug having a hole in the center to serve as the orifice for oil. In operation, the injection of oil through the spray is adjusted so that a cone of atomized oil is produced which falls short of the carburetor and does not impinge against the wall of carburetor pipe 29. During an uprun step, water gas passes from generator to carburetor through the angle connection and becomes quite turbulent in making the right angle turn. The turbulent motion of the gas, and the heat of the gas, and of the refractory lining of the angle connection, causes the atomized oil to be thoroughly admixed with the gas and partially vaporized when it enters the top of the carburetor.

Generator oil spray 34 passes through and is secured to the removable door 31 in leg 30 of pipe 28 and is directed toward the generator along the axis of pipe 28. The spray pipe extends beyond the leg portion and terminates in a single spud 35 located within the circumference of pipe 29 short of carburetor spray spud 33. Spud 35 likewise consists of a pipe plug having a hole in the center to serve as the orifice for oil. By means of this generator oil spray, a conical spray of oil coaxial with generator pipe 28, can be directed into the generator pipe toward the upper interior of the generator. The generator oil spray is adjusted to fall short of the generator and so as not to impinge against the wall of generator pipe 28. During a backrun step, superheated steam passes from carburetor to generator through the angle connection and the injected oil will become thoroughly admixed with the steam and partially vaporized by the time it enters the top of the generator.

The exterior of carburetor 11 is of the usual vertical cylindrical type. The carburetor has a dome 36, vertical wall 37, refractory lining 38, crossover connection 14 in the base joining it with the superheater, and top connection 39 joining the top with pipe 29 of angle connection 13. The top connection 39 forms an extension of pipe 29 and is adapted to pass gases from the latter through the top or dome portion 36 of the carburetor, in a somewhat downwardly inclined direction toward the vertical axis of the carburetor. The horizontal crossover connection 14 at the base has about the same cross-sectional area as the angle connection pipes and top connection 39, and is located in the opposite side of the carburetor.

According to the present invention, the interior space of the carburetor is free of checkerbrick work and is preferably divided into three superposed unobstructed zones of roughly equal volume, by means of two refractory partitions or baffles each of which extend more than half way across the interior of the carburetor, being spaced from the wall of the carburetor at oppositely disposed sides so that the three zones are connected in series. Gases in passing through the carburetor are thereby caused to follow in a substantially vertical direction through a lengthy circuitous path, entering at the top and leaving at the bottom.

Upper partition 40 is situated directly below top connection 39 and substantially in line with angle connection pipe 29. It is constructed of refractory brick, slopes downwardly both ways from the center thereof as shown in Fig. 4 and is inclined downwardly, at an angle of preferably less than 45° to the horizontal, toward the carburetor wall opposite the top connection. The partition bonds circumferentially with the refractory lining 38 of the vertical wall 37 of the carburetor, and extends across the carburetor except for a segmental passageway 41 of substantial extent defined by the wall of the carburetor opposite to the top connection, and the edge 42 of the partition 40, which edge extends across the carburetor as a chord.

Lower partition or baffle 43 is similar to the upper partition and slopes downwardly from edge 45 in a direction toward the crossover 14 and is roughly in parallelism with the upper partition. Baffle 43 joins the wall of the carburetor just above and contiguous to the crossover connection 14. Passageway 44, of segmental shape, is defined by the chord-like edge 45 of the partition and the side of the carburetor remote from crossover 14. Passageways 41 and 44, it will be noted, are of relatively large cross-sectional area; at least equal to the cross-sectional area of the inlet to and exit from the carburetor.

The two partitions 40 and 43 cause gases entering at the top of the carburetor to flow downwardly across the carburetor, through passageway 41, downwardly back to and through passageway 44, and thence downwardly across to the crossover at the base, the gases thus going in a three-pass meandrous flow down through the carburetor from top to bottom. The arrows on the drawing indicate roughly the path of flow of blast and uprun water gas through the apparatus. During a backrun step, the flow of steam follows the same path in reverse direction.

With this angle connection and carburetor arrangement, an intimate mixture of the enrichment oil (in atomized and partially vaporized form) and water gas entering at the top of the carburetor during an uprun step, results. This mixture of gas and oil immediately comes in contact with the top surface of the upper arch and the surface of the dome of the carburetor, and gasification of the entrained oil takes place immediately under conditions particularly adapted to securing rapid vaporization and cracking of the oil.

The form, inclination and arrangement of the arches produces a highly turbulent type of flow, under conditions particularly adapted to securing efficient heat transfer and full utilization of the heat stored in the carburetor, during the lengthy and tortuous passage of the oil-gas mixture through the carburetor.

Carbonaceous material deposited in the carburetor during an uprun step is spread in relatively thin layers over the surfaces of the partitions. Hence, free flow of air, admixed with blast gases around the carbonaceous particles on the baffles over which the blast gases containing air sweep, takes place, thus supporting combustion of the carbonaceous deposits and effecting the removal thereof.

While the invention has been described with particular reference to embodiment in a carbureted water gas set of the backrun type, the invention is not limited thereto, as for example the carbureting arrangement can be used in a set equipped only for forward gas making runs. Furthermore, it is not intended that the invention be limited to the specifically described details, which have been set forth as illustrative.

What we claim is:

1. In combination in a carbureted water gas set: a generator, a substantially vertical carburetor having a refractory lining and having refractory baffles each extending more than halfway across the interior to divide the interior into superposed zones connected in series by large openings at alternately opposite sides of the carburetor, said zones being of a horizontal cross sectional area corresponding substantially to the horizontal cross sectional area of said carburetor, an inlet at the top of the carburetor communicating with the uppermost zone and an outlet at the bottom communicating with the lowermost zone, said openings being of a cross-sectional area at least equal to the cross-sectional area of said inlet, a connection between the generator and the inlet at the top of the carburetor; and means for introducing enrichment oil into the carburetor to carburet water gas passing therethrough from the generator.

2. In combination in a carbureted water gas set: a generator, a substantially vertical carburetor having a refractory lining, a top inlet in one side of the dome and an oppositely disposed side bottom outlet, a downwardly sloping refractory baffle extending more than halfway across the carburetor from below the top inlet leaving a large opening at the opposite side therefrom, a refractory baffle sloping in rough parallelism therewith and extending more than halfway across the carburetor from above the bottom outlet and leaving a large opening at the opposite side therefrom, to provide three superposed zones connected in series; an angle connection between the generator and the top inlet of the carburetor, for conducting water gas and blast gases from the generator to the carburetor means for introducing oil into the angle connection directed toward the carburetor and means for mixing secondary air with blast gases from said generator.

3. A carburetor for a water gas set comprising a substantially vertical chamber having a refractory lining, a top side inlet and a base side outlet, the outlet being disposed in the side of the carburetor opposite to that containing the inlet, a downwardly sloping refractory baffle extending more than halfway across the carburetor immediately below the said inlet, leaving a large opening contiguous to the side of the carburetor containing the outlet, and an upwardly sloping refractory baffle extending more than halfway across the carburetor immediately above the bottom outlet, leaving a large opening on the side of the carburetor containing the said inlet; thereby providing three superposed substantially unobstructed zones connected in series, said superposed zones being of a horizontal cross sectional area corresponding substantially to the horizontal cross sectional area of said carburetor.

4. A carbureted water gas set comprising in combination a generator, a refractory lined carburetor and a superheater located in separate and detached shells and connected in series, said carburetor having a top inlet connected to said generator by a substantially horizontally disposed angle connection and a base outlet connected to said superheater, at least one downwardly sloping refractory baffle extending partially across the interior of said carburetor from one side thereof toward the opposite side thereof and at least one upwardly sloping refractory baffle extending from said opposite side partially across said carburetor in rough parallelism with said downwardly extending baffle, said baffles providing a plurality of superposed zones each of a horizontal cross sectional extent substantially equal to the horizontal cross sectional area of said carburetor, means for introducing oil into the angle connection between said generator and carburetor cocurrent to the flow of water gas through said angle connection, said oil introducing means being directed toward the interior of said carburetor and means for mixing secondary air with blast gases from said generator.

5. A carbureted water gas set comprising in combination a generator, a refractory lined vertical carburetor and a superheater connected in series, said carburetor having at one end an inlet connected to said generator and at the other end an outlet connected to said superheater, a refractory baffle sloping from one wall of said carburetor at a location adjacent said inlet toward the outlet end of said carburetor and toward the opposite wall of said carburetor, said baffle extending partially across the interior of the carburetor and defining with said opposite wall a gas passageway, a refractory baffle sloping from said opposite wall of said carburetor at a location adjacent said outlet toward the inlet end of said carburetor and toward said first named wall of said carburetor, said last named baffle extending partially across the interior of the carburetor and defining with said first named wall a gas passageway, said baffles extending in rough parallelism with each other and providing a plurality of superposed zones each of a horizontal cross-sectional extent substantially equal to the horizontal cross-sectional extent of said carburetor, and means for introducing oil into water gas flowing through said set.

6. A backrun process of making carbureted water gas in a set involving a generator containing a fuel bed therein and a carburetor connected by a substantially horizontally disposed angle connection to the carburetor which comprises blasting the fuel bed with air, burning the resultant blast gases, passing the burning blast gases through the carburetor along a meandrous path extending through zones substantially coextensive with the horizontal cross-sectional area of the carburetor, introducing steam into said fuel bed and passing the resultant water gas through the angle connection to the carburetor while spraying oil into the carburetor, passing the resultant mixture of oil and water gas into and down through the carburetor in a meandrous turbulent stream, withdrawing the resultant carbureted water gas from the carburetor, passing steam through the carburetor and into and through the angle connection into the generator, spraying oil directly into said angle connection toward the generator and cocurrent to the flow of steam passing through the angle connection, passing the resultant mixture of oil and steam through the fuel bed into the generator and withdrawing the resultant carbureted water gas from the generator.

7. A method of making carbureted water gas utilizing heavy oil as the carbureting medium in a set involving a generator containing a fuel bed and carburetor connected to the generator by a horizontally disposed angle connection, which comprises blasting the fuel bed with air, burning the resultant blast gases, passing the burning blast gases downwardly through the carburetor along a meandrous path of general S-shape extending through zones substantially co-extensive with the horizontal cross-sectional area of said carburetor, introducing steam into the fuel bed of the generator, passing the resultant water gas through the angle connection to the carburetor while spraying heavy oil into the angle connection toward the carburetor and cocurrent to flow of the water gas, passing the resultant mixture down through the carburetor in a meandrous turbulent stream of general S-shape thereby gasifying the oil and producing carbureted water gas, withdrawing the water gas from the bottom of said carburetor, then passing steam in a reverse direction up through the carburetor, through the angle connection and downwardly into the generator fuel bed while spraying heavy oil into the steam passing through the angle connection cocurrent to the flow of the water gas and in the direction of the generator and passing the resulting mixture through the fuel bed of the generator to produce carbureted water gas.

ROBT. P. JONES.
ROBERT L. ELLIS.